United States Patent Office 3,490,932
Patented Jan. 20, 1970

1

3,490,932
HYDROPHILIC ADHESIVE COMPOSITION FOR USE AS AN ADJUVANT IN LIQUID COATING MATERIALS
Leonard L. Smith, 22996 Avenue 232, Lindsay, Calif. 93247; Donald B. Kempfer, 1047 E. Vandalia, Porterville, Calif. 93257; and Robert O. Houston, 825 N. Homassel, Lindsay, Calif. 93247
No Drawing. Continuation-in-part of application Ser. No. 614,023, Feb. 6, 1967. This application Sept. 30, 1968, Ser. No. 763,971

Int. Cl. C09j *1/00;* A01n *17/08*

U.S. Cl. 106—157 6 Claims

ABSTRACT OF THE DISCLOSURE

A substantially hydrophilic colloidal adhesive composition containing sodium bentonite, dry milk solids, Overton clay, vegetable gums, lime, and/or sodium bicarbonate for use as an adjuvant in solution with spray materials such as fungicides, pesticides, insecticides, herbicides, nutritional sprays, whiteners, and the like, which maintains its hydrophilic and colloidal properties in such spray solution for improved distribution and adherence of the solution upon a surface of application for extended periods with the dry milk solids causing the composition to deposit the spray solution in minute droplets on such surface for retention of substantially heavier deposits of said spray materials and which serves as an insect bait when employed with insecticides and the like.

CROSS-REFERENCE TO RELATED APPLICATIONS

The present application is a continuation-in-part of our co-pending application, Ser. No. 614,023, entitled "Adhesive Composition for Liquid Coating Materials," filed Feb. 6, 1967, which was a continuation-in-part of application Ser. No. 524,857, entitled "Spray Adjuvant," filed Feb. 3, 1966.

BACKGROUND ON THE INVENTION

Various adjuvant compositions employed with aqueous solutions or suspensions containing additives such as fungicides and insecticides are applied by spraying on fruit trees, particularly citrus, walnut and olive trees. These compositions permit the materials to spread substantially evenly over the surface of application and are intended to form a protective coating upon the surface of application. Most adjuvant compositions are formed with wetting agents to reduce the surface tension on the surface of application, such as foliage, and thereby to assist distribution of the solution. These wetting agents have the drawback that when applied to most waxy plant surfaces the solution has a tendency to run off the plants, leaving substantially no residue. Furthermore, their adhesive properties are poor and consequently the spray residue peels or flakes when dry and is readily removed by rain or irrigation water sprinklers.

Other types of adjuvant compositions contain a calcium bentonite which serves as the binding agent for the various additives in the solution and also forms a film on the surface of application. Unfortunately, these films have poor adhering properties and consequently can be washed off easily during a rain or by sprinkling. Furthermore, their compatibility or absorptive properties for many insecticides, pesticides and fungicides is either poor or limited.

It has already been proposed to add an inexpensive material such as lime to the bentonite as a whitener where the spray is to be used in growing areas having prolonged and intense sunshine. However, lime tends to dehydrate the foliage if present in too large quantities and this presents a limit to the amount which can be employed. Additionally, the handling of powdered lime entails a dust problem which can pose a series health hazard because of its corrosive nature.

Other types of adjuvant compositions employ bentonite and a carbohydrate gum to improve the absorptive properties of the bentonite for various additives used when spraying. A limiting factor here is the extremely high cost of the gum.

Casein based adjuvant compositions are also known but in addition to having poor adhesive properties, they are incompatible with many of the above additives and this restricts their use.

SUMMARY OF THE INVENTION

It is therefore an object of the present invention to provide an improved adhesive composition as an adjuvant for liquid spray materials.

Another object is to provide an adhesive composition for use as an adjuvant in a solution which maintains the ingredients in suspension for useful periods of time.

Another object is to provide an adhesive composition which is formulated as a hydrophilic colloid which will remain hydrophilic in aqueous carriers with fungicides, insecticides, herbicides, nutritional sprays, whiteners and the like, and which will remain hydrophilic after application upon plant surfaces and the like.

Another object is to provide such an adhesive composition containing sodium bentonite which provides a protective colloid for ingredients in the solution.

Another object is to provide an adhesive composition of the character described which causes agricultural spray ingredients to adhere strongly to an applied surface of coverage and which resists washing away by water.

Another objects is to provide an adhesive composition which causes the spray solution to be distributed substantially evenly over the applied surface of coverage in a plurality of minute droplets so as to retain a maximum amount of residual spray solution or suspension on the surface of application and gradually to release the active ingredients particularly when employed with plant nutrient sprays and insecticides for good plant growth and/or insect protection over extended periods.

Another object is to provide an adhesive composition including a sodium bentonite, lime, clay, carbohydrate gum, and dry milk solids in which the latter ingredient serves as a hydrophilic colloidal stabilizer, as an adhesive, and as an insect bait.

Another object is to provide an adhesive composition which obviates the necessity of handling powdered lime at the site of use.

Further objects and advantages will become apparent in the subject description in the specification.

DESCRIPTION OF THE PREFERRED EMBODIMENT

It has bee found that by providing a spray adjuvant containing a basic electrolyte such as lime or sodium bicarbonate, or a mixture of both, and sodium bentonite within a narrow concentration range, rather than the usual calcium bentonite, a spray adjuvant is produce having greatly improved properties. Lime, sodium bicarbonate, or other suitable colloidal flocculating agent is employed to disperse the bentonite in water. Lime and sodium bicarbonate are preferred, however, because they are inexpensive and provide a certain amount of buffering action. A relatively small amount of a carbohydrate gum is also employed to improve the structure of the bentonite in the water and permit better absorption of additives.

A suitable sodium bentonite which will absorb up to thirty times its own dry volume includes montmorillonite having the formula:

$$Na_2O.Al_2O_3.4SiO_2.NH_2O$$

Another bentonite which is suitable is sodium beidellite. It has the formula:

$$Na_2O.AlO_3.3SiO_2.NH_2O$$

Once the bentonite is an aqueous carrier, it furnishes a highly absorptive constituent for insoluble fungicides, insecticides, nutritional sprays, whiteners and the like. The type of bentonite described above with its hydrophilic nature and its lattice forming ability absorbs all types of spray solutions and holds them in suspension. After the spray application of the composition to plant surfaces and the like, and the solution is dried, the bentonite is extremely important during moist or wet periods in which it again becomes hydrophilic and releases absorbed materials on or into the plant leaf surfaces without being washed away. The adhesive composition of the present invention has the ability to hold such materials on plant surfaces for many months during adverse weather conditions during which time the composition gradually releases the easily predetermined amounts of active ingredients for good plant growth or insect protection.

A suitable carbohydrate gum is selected from the group consisting of gum arabic, cholla gum, mesquite gum, cherry gum, gum tragacanth, flex seed mucilage, gum karoya, carob-seed gum, and seaweed extract such as agar-agar. These gums are largely composed of potassium, calcium and magnesium salts of hydrophilic carbohydrate acidic bodies. It has been found that the gum tragacanth or gum acacia, or a combination of both, is ideally suited to the formulation of the present invention. They constitute hydrophilic colloids which provide stabilizing and adhesive properties and maintain the various described ingredients in a semi-gelled condition after residue formation on plant surfaces. Also, during moist conditions, the described gums become hydrophilic and permit the release of the various spray additives for extended protection and care of the plant surfaces.

The dry milk solid is a significant ingredient in the composition of the present invention because of its performance and effectiveness in spray solutions. Such dry milk solid is a hydrophilic colloid composed approximately of 36.5% protein, 51.5% lactose, 1% fat, 8% minerals and 3% moisture. The protein component consists mainly of casein and albumen which is inherently amphoteric in that it can be dissolved in either acid or basic solutions and is able to produce upon ionization either positive or negative ions depending upon the character of the external solution. Because of its function in the present composition, it is conducive to the maintenance of a stable spray emulsion, thereby precluding any substantial dehydration of the bentonite. This induces precipitation and a lowering of the viscosity of the solution. The protein also acts as one of the adhesive elements in the composition. The lactose component of the dry milk solids is one of the major adhesive agents in the composition of the present invention. Such component is not easily soluble and does not crystallize after drying on plant surfaces but rather forms with the other spray ingredients an amorphous adhesive layer for the minute spray droplets. Because of its sweet taste and odor, it acts as a bait which is extremely important in the control of all types of insects.

It has also been found that addition of magnesium clay, known as Overton clay, markedly increases the adhesive properties of the spray adjuvant of the present invention. Overton clay is mined in Overton, Nev. and is well known in the agricultural spray art. Such Overton clay constitutes a weak basic electrolyte and is slightly hydrophilic. Besides functioning as an excellent whitener, there are no dehydration problems associated with the use of such clay. As described, this clay behaves to a minor extent as an electrolyte having some gelling or water absorbing qualities and further aids in minimizing dehydration of the bentonite in its aqueous carrier. Combined with the sodium bentonite, lime, gum, and dry milk solids, the clay produces a spray adjuvant having ideal adhesive properties. Overton clay has the following analysis following ignition:

| | Percent |
|---|---|
| Free moisture, max. | 1.00 |
| MgO | 35.28 |
| $SiO_2$ | 11.76 |
| $Al_2O_3$ | 4.00 |
| CaO | 6.16 |
| $Fe_2O_3$ | .52 |
| Ignition loss (950° C.) | 43.10 |
| pH (10% solids) | 9.2 |

The optimum weight of the bentonite should vary from about 60% to 80% and the total weight of the lime and sodium bicarbonate should vary accordingly from about 1% to 30%. It is noted that the sodium bicarbonate can be added in various desired percentages in combination with the lime or to such an extent entirely to exclude the lime. However, in no instance would the amount of sodium bicarbonate exceed the above designated maximum percentage for the lime and sodium bicarbonate.

The concentration of Overton clay can vary from 5% to 35% by weight and replaces the bentonite to the extent that it is employed. For purposes of calculating the bentonite to lime ratio, the weight of the clay is added to the bentonite.

The trace concentration of gum used is approximately from 1% to 10%. The gum improves the gel structure of the bentonite in the water and permits better absorption of additives.

Tht dry milk solid in the present composition is primarily responsible for the formation of the many small droplets of the spray solution on the waxy leaves of the plant leaves, stalks, and other tissues. It is noted that a leaf coated with many small droplets will, when dry, retain a much greater residue of the active spray material than a spray containing a wetting agent which spreads thin film upon the plant surfaces. It has been observed that even though wetting agents are included in many commercial spray materials, the desired hydrophilic colloidal and adhesive properties of the formulation of the present invention are not appreciably impaired by such agents. The preferred formula of the adhesive composition of the present invention has the following dry composition, by weight:

| | Percent |
|---|---|
| Bentonite | 60 |
| Dry milk solids | 8 |
| Lime | 25 |
| Overton clay | 6 |
| Vegetable gum | 1 |

The bentonite, dry milk solids, gums, lime and Overton clay are dry-mixed and shipped in the dry state. The bulk density of the adhesive composition is:

| | Lb. per cu. ft. |
|---|---|
| Loose packed | 46.7 |
| Compacted | 66.7 |

The average particle diameter is 15 microns. The screen analysis:

| | Percent retained |
|---|---|
| 300 mesh screen | 15.7 |
| Sub sieve size after passing 300 mesh screen, 10 microns | 40 |

The above ingredients are all available in powdered form and remain in powdered form in a wide range of environmental atmospheric conditions. This, of course, is important from the standpoint of handling and freight charges. At the site of use, 500 gallons, approximately 400 pounds of water, is mixed with about 20 pounds of the dry composition if it is to be sprayed. Additional dilution is, of course, possible depending on such requirements as the extent of insecticide and fungicide coverage desired. It is further apparent that a more viscous mixture can be provided if the mixture is to be applied by spreading with a paddle or painting with a brush. Insecticides, fungicides, herbicides, nutritional sprays and sun protectants are added to the water, as necessary.

Examples of suitable spray adjuvant formulations for use with fungicides, insecticides, herbicides, nutritional sprays and whiteners are:

Fungicide spray formula per 500 gal. tank: Lbs.
   Zink sulfate _____ 17
   Basic copper _____ 6
   Lime _____ 100
   Adhesive composition of the present invention __ 6

Insecticide spray formula per 500 gal. tank: Lbs.
   Parathion _____ 6
   Ethion _____ 8
   Adhesive composition of the present invention __ 3

Herbicide spray formula per 100 gal. tank:
   2–4–D _____ qt__ 1
   2–4–5–T _____ gal__ 1
   Adhesive composition of the present invention _____ lb__ 3

Nutritional spray formula per 500 gal. tank: Lbs.
   Ortho nutrient D (nitrogen, iron, zinc, phosphate, manganese, magnesium) _____ 15
   Adhesive composition of the present invention __ 3

Whitener spray formula per 500 gal. tank: Lbs.
   Overton clay or lime or both _____ 200
   Adhesive composition of the present invention __ 6

The liquid mixture containing the adhesive composition of the present invention is strongly adherent to foliage or the like and resists washing off by water. The superior ability of the composition of the present invention to hold the described active spray materials on plant surfaces for many months even during adverse weather conditions while at the same time releasing the predetermined amounts of active materials to the plant leaves for good plant growth or insect protection has been observed. For example, a single spraying on orange trees in the Lindsey, Calif., area on November 1st adhered to the leaves and lower trunks for several months despite rain and irrigation water sprinkling. Furthermore, the California Division of Forestry has used the adhesive composition of the present invention with the herbicides 2–4–D and 2–4–5–T which are systemic poisons for the control of Yerba Santa, Bush Poppies, Manzanita, and other range brush species with outstanding results. The adhesive composition of the present invention passed the most rugged tests possible on such plants since the tets were made in the months of August and September, when most brush killing chemicals are least effective. It was found that the adhesive composition of the present invention literally sticks the potent herbicides to the slick leaved plants and allows the standard brush killer mix of 2–4–D and 2–4–5–T to be absorbed by the plant. Vastly superior results were obtained because of the adherence of the systemic poison to the plant surfaces, the poison was more uniformly and completely retained upon the plant surfaces, and the poison was released to the plant during the critical period when it was most effective.

It has also been observed that when the adhesive composition of the present invention is used with nutritional sprays that the release of minor elements during moist winter periods enhances markedly the color of the leaves on trees with a corresponding increase in the amount of new shoot growth.

When the adhesive composition of the present invention is used with a fungicide spray such as copper oxide for the control of Brown Rot and Septoria in oranges, and Peacock Spot in olives, it has been noted that the continual slow release of the copper oxide during the winter months does a superior job in the complete control of these fungi.

When the adhesive composition of the present invention is used with whiteners, such as lime, magnesite or celite, the coaction of the adhesive composition with these substances in forming many small droplets instead of a film coverage of the leaf surface slows down photosynthesis but still protects the plant and fruit from overburning.

Accordingly, the adhesive composition of the present invention provides an improved adjuvant for a wide variety of aqueous sprays. It is almost instantly dispersed in such solutions. The adhesive composition of the present invention provides highly absorptive properties which dispose substantially heavier deposits of the spray solutions on the plant surfaces in the form of many small droplets. Because of its superior adhesiveness to plant surfaces, the spray material is retained for extended periods and by virtue of its hydrophilic properties the residual deposit in the various spray solutions are slowly released over substantial periods of time. Furthermore, the minute droplet distribution of the spray resists coalescence and run off. Such distribution does not substantially hinder photosynthesis in view of the many interstices between the residual deposits of spray droplets. When employed with insecticides, the dry milk solids therein attract insects to residual deposits and because of the hydrophilic nature of the composition the deposits are enhanced and rejuvenated by subsequent wetting by rain or irrigation sprinkler water.

While the instant invention is described in terms of particular ingredients, and ranges thereof, to be used, it is obvious that many modifications and variations in the nature and proportions of the ingredients may be made without departing from the spirit and scope of the invention, and only such limitations should be imposed as are indicated in the appended claims.

Having described our invention, what we claim as new and desire to secure by Letters Patent is:

1. An adhesive composition formulated as a hydrophilic colloid for liquid coating materials which is capable of remaining hydrophilic in an aqueous carrier with said coating materials and after their deposit upon a surface of apcompliaction comprising about 60 to 80 parts by weight of sodium bentonite; about 2 to 20 parts by weight of dry milk solids containing about one third protein, one half lactose and the remainder being fat, minerals and moisture; about 1 to 30 parts by weight of lime; about 5 to 35 parts by weight of Overton clay and about 1 to 10 parts by weight of a carbohydrate gum selected from the group consisting of gum arabic, cholla gum, mesquite gum, cherry gum, gum tragacanth, flax seed, mucilage, gum karoya, carobseed gum, and seaweed extract such as agar-agar.

2. The adhesive composition for liquid coting materials of claim 1 in which the dry milk solid is a hydrophilic colloid containing approximately 36.5% protein, 51.5% lactose, 1% fat, 8% minerals, and 3% moisture which serves in the adhesive compound as a stabilizer to minimize dehydration of the bentonite, as an adhesive, and as a bait for insects.

3. The adhesive composition for liquid coating materials of claim 1 in which the Overton clay serves as a weak electrolyte to aid in the dispersement of the bentonite in solution and to assist in minimizing dehydration of the bentonite with the Overton clay comprising after ignition approximately 1% free moisture, 35.28% MgO, 11.76% $SiO_2$, 4.00% $Al_2O_3$, 6.16% CaO, and .52% $Fe_2O_3$, with a pH of approximately 9.2%.

4. The adhesive composition for liquid coating materials of claim 1 containing water in sufficient amount to permit spray application of the resultant mixture.

5. The adhesive composition for liquid coating materials of claim 1 in which the bentonite is selected from the class consisting of: montmorillonite, beidillite and mixtures thereof.

6. The adhesive composition for liquid coating materials of claim 1 including about 1% to 30% sodium bicarbonate which replaces the lime to the extent employed.

References Cited

UNITED STATES PATENTS

| | | | |
|---|---|---|---|
| 626,537 | 6/1899 | Hall | 106—148 |
| 730,506 | 9/1903 | Adams | 106—148 |
| 1,770,886 | 7/1930 | Kharasch | 424—291 |
| 1,910,684 | 5/1930 | Farrar | 424—158 |
| 2,260,882 | 2/1939 | Berg | 106—208 |
| 2,430,576 | 7/1944 | Littler | 424—141 |
| 3,120,445 | 4/1964 | Aluisi | 106—286 |

JULIUS FROME, Primary Examiner

T. MORRIS, Assistant Examiner

U.S. Cl. X.R.

106—139; 424—141, 158, 291